(12) United States Patent
Luo

(10) Patent No.: US 7,330,866 B2
(45) Date of Patent: Feb. 12, 2008

(54) SYSTEM FOR FREQUENCY-DOMAIN SCALING FOR DISCRETE COSINE TRANSFORM

(75) Inventor: Fa-Long Luo, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 699 days.

(21) Appl. No.: 10/612,202

(22) Filed: Jul. 1, 2003

(65) Prior Publication Data

US 2005/0004964 A1  Jan. 6, 2005

(51) Int. Cl.
*G06F 17/14* (2006.01)

(52) U.S. Cl. ...................... 708/402; 708/401
(58) Field of Classification Search ............. 708/402
See application file for complete search history.

(56) References Cited

U.S. PATENT DOCUMENTS 5,253,192 A * 10/1993 Tufts .................... 708/403
6,487,574 B1 * 11/2002 Malvar .................. 708/400
6,587,590 B1 * 7/2003 Pan ....................... 382/250

\* cited by examiner

*Primary Examiner*—D. H. Malzahn
(74) *Attorney, Agent, or Firm*—Patterson & Sheridan, LLP

(57) ABSTRACT

A system for frequency-domain scaling for DCT computation. Scale factors are applied to coefficients during the final steps of composition of 2-point DCTs. The number of multiplications and required precision are reduced. Fixed values for various scale factors can be computed and stored prior to executing the DCT so that performance can be improved. The fixed values are derived by knowing the length of the time-domain sequence. Some fixed values can be derived independently of the length of the time-domain sequence. The approach of the invention can also reduce the number of multiplications to compute the transform, and allow smaller bit-width sizes by reducing the number of required high-precision calculations.

22 Claims, 3 Drawing Sheets

SYSTEM FOR FREQUENCY-DOMAIN SCALING FOR DISCRETE COSINE TRANSFORM

BACKGROUND OF THE INVENTION

This invention relates in general to digital signal processing and more specifically to frequency-domain scaling in discrete cosine transform applications.

Frequency-domain transforms are a valuable operation in many computer processing applications. Common transforms include Fourier Transform (FT), Discrete Fourier Transform (DFT), Fast Fourier Transform (FFT), Discrete Cosine Transform (DCT), Modified DCT (MDCT), etc. Such transforms, and techniques for implementing the transforms, are shown, e.g., in "The Transform and Data Compression Handbook," Rao, K. R. and Yip, P. C., CRC Press, New York, 2000; and in "The quick Fourier transform: a FFT based on Symmetries," Guo, H.; Sitton, G. A. and Burrus, C. S.; IEEE Trans. on Signal Processing, Vol. 46, No. 2, 1998.

The DCT is used extensively in audio and image processing. For example, many compression standards such as Joint Photographic Expert's Group (JPEG) and Motion Picture Experts Group (MPEG) use the DCT at the heart of their processing.

A problem with implementing frequency-domain transforms in digital processing systems is that the operations to compute the transform, and inverse transform, can be complex. Often, the accurate calculation of the transform requires performing high-precision multiplication and addition on many values. For example, there may be many hundreds of thousands, millions, or more, pixels in a single frame of an image. Frames of an image may be required to be processed at rates of, e.g., 24, 30 or 60 frames per second. The transforms may be required to operate in real time on the frames of pixels values. Thus, any small improvement in speed, precision or efficiency of the low-level transform calculations can often lead to a tremendous improvement in the overall processing. Such improvements can result in a higher-quality image given a fixed set of resources such as processing power and memory, in a device such as a consumer electronic playback system for audio and/or video.

Four traditional types of DCTs are referred to as DCT-I, DCT-II, DCT-III and DCT-IV, as defined in the equations, below. These four types can be calculated via one another. For example, an N-point DCT-II could be decomposed into N/2-point DCT-I and N/2-point DCT II, the later could be further discomposed until not any multiplication is needed. In image processing a two-dimensional DCT is used. The two-dimensional DCT can be obtained by performing multiple 1-dimensional DCTs with proper matrix transpositions. Other transforms can be achieved with the DCTs shown below. For example, a DFT could be implemented by DCT-I.

DCT-I:

$$DCT(k, N+1, x) = \sum_{n=0}^{N} x(n)\cos\left(\frac{\pi n k}{N}\right) \quad (k = 0, 1, 2, \ldots N); \quad (1)$$

DCT-II:

$$DCT(k, N, x) = \sum_{n=0}^{N-1} x(n)\cos\left(\frac{\pi(2n+1)k}{2N}\right) \quad (k = 0, 1, 2, \ldots N-1); \quad (2)$$

DCT-III:

$$DCT(k, N, x) = \sum_{n=0}^{N-1} x(n)\cos\left(\frac{\pi n(2k+1)}{2N}\right) \quad (k = 0, 1, 2, \ldots N-1); \quad (3)$$

DCT-IV:

$$DCT(k, N, x) = \sum_{n=0}^{N-1} x(n)\cos\left(\frac{\pi(2n+1)(2k+1)}{4N}\right) \quad (k = 0, 1, 2, \ldots N-1); \quad (4)$$

where x(n) is the time-domain sequence.

The prior art has many different approaches and optimization techniques for DCT processing. FIG. 1, shows a typical approach using decomposition. In FIG. 1, flowchart 10 illustrates basic steps in a process whereby a time-domain signal is decomposed, subjected to 2-point DCT and then composed to produce a full DCT transform.

Flowchart 10 of FIG. 1 is entered at step 12. At step 14, the time-domain sequence, x(n) (e.g., a function describing picture element values in an image, audio waveform sample values, etc.), is a discrete function of N points. Since it is desirable to perform a DCT on two points at a time, the N point sequence is successively "decomposed" into sequences of length $N_i$ until $N_i$=2. This is shown by step 18 which performs the decomposition to result in x^(n) having a lesser sequence. A check is made at step 20 to determine whether the decomposed sequence is of length 2. If not, the decomposition step is repeated until sequences of length 2 are attained.

Next, at step 30, two-point DCTs are performed to yield x'(k), where k represents a frequency band and the value of x^(k) represents the magnitude, or power, of the frequency band, as is known in the art. Steps 32, 34 and 36 perform a composition of the 2-point DCTs to build up the resulting frequency-domain function x(k) to a function, or sequence, of N coefficients. Thus, step 34 successively performs a composition function on the results of the 2-point DCT to yield x'(k) as shown at 32. For each iteration of the composition step, a larger set of coefficients, $N_i$, is attained. At step 36 a check is made as to whether $N_i$=N. If not, composition is continued.

When $N_i$=N at step 36 the result is an N coefficient DCT, x(k) and the transform terminates at step 40.

One drawback of the prior art approaches is that scaling of parameters is typically performed in the time-domain at decomposition step 18. The factor $$\frac{1}{2\cos\left(\frac{\pi n}{N}\right)}$$

is used to scale coefficients in the time-domain sequence. Since this factor results in very large values it is difficult to represent the factor, and subsequent operations with the factor, efficiently in the binary arithmetic that is used in digital processors. When the word size of a central processing unit (CPU) is limited the handling of small fractional numbers with a high degree of precision can require double-width, or larger, representations and slower floating point arithmetic operations. Truncating or rounding the values loses precision and degrades the accuracy of the transform. The introduction of a large scale factor at step 18 and 16 of FIG. 1 also means that the effects of the large number representations are propagated to subsequent steps in the calculations. Other effects from time-domain scaling approaches of the prior art can include increased memory requirements and larger bandwidth for data transfers within a processing system.

SUMMARY OF THE INVENTION

The present invention uses frequency-domain scaling for DCTs. Scale factors are applied to coefficients during the final steps of composition of 2-point DCTs. The number of multiplications and required precision are reduced. Fixed values are derived from the known length of the time-domain sequence. Some fixed values can be derived independently of the length of the time-domain sequence. The approach of the invention can also reduce the number of multiplications to compute the transform, and allow smaller bit-width sizes by reducing the number of required high-precision calculations.

In one embodiment the invention provides a method for performing a frequency-domain transform on a time-domain signal having a sequence length N, wherein the method is executed by a processor, the method comprising decomposing the time-domain signal to a plurality of decomposed signals, wherein each of the plurality of decomposed signals includes a sequence length less than N; performing a transform on the plurality of decomposed signals to obtain a transformed signal; composing the plurality of transformed signals to obtain a composed signal, including a substep of scaling at least one of the transformed signals.

DETAILED DESCRIPTION OF THE PREFERRED EMBODIMENTS

Figure 1:
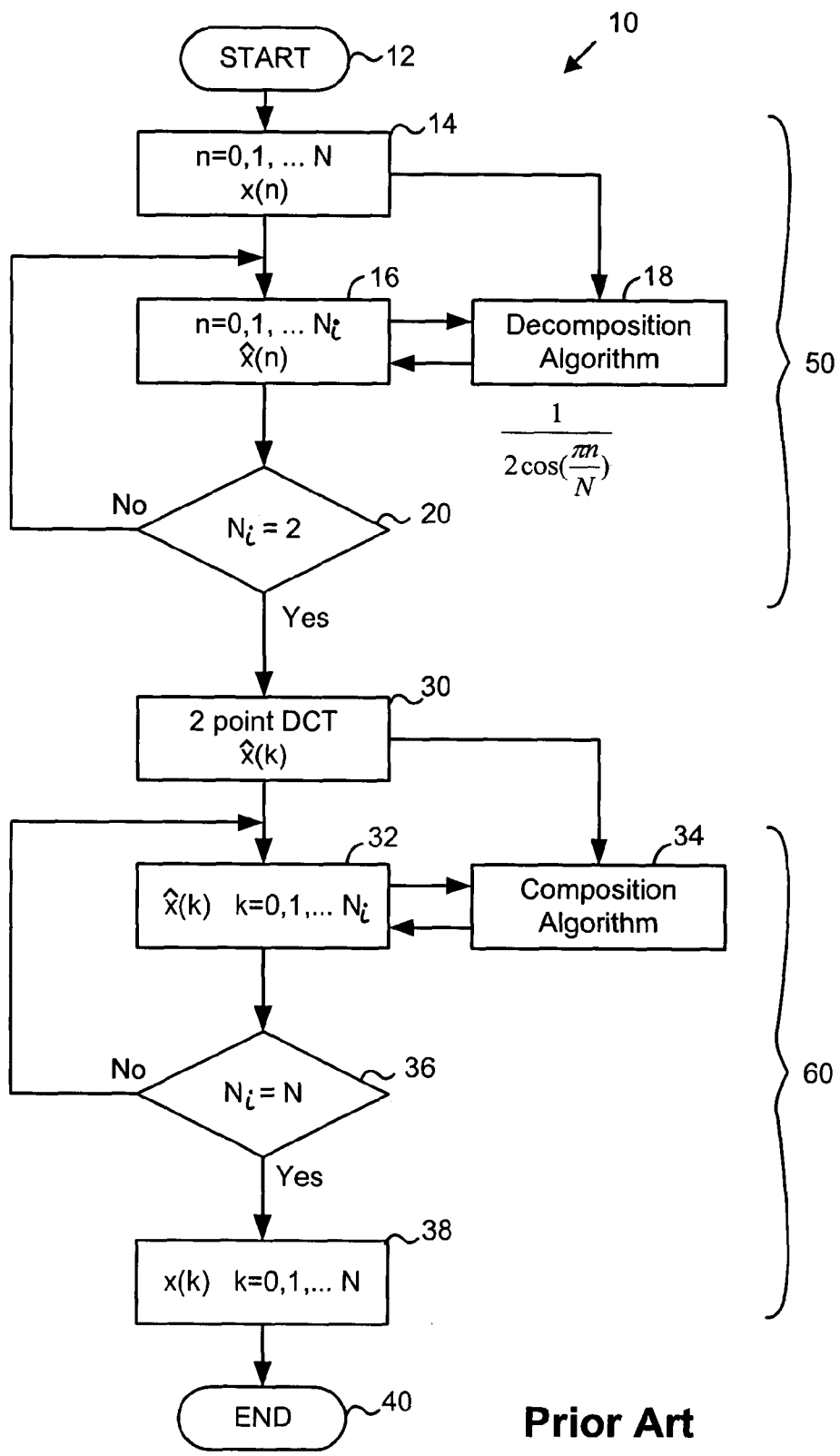
FIG. 1 is a prior art approach to obtaining a discrete cosine transform.

One aspect of the invention uses scale factor multiplication in a composition phase of a system similar to that of FIG. 1 in the prior art. By moving the scale factor multiplication to a late step in the transform procedure, the number of high-precision multiplications required to implement a DCT can be reduced. In a preferred embodiment, the scale factor multiplication is done in the frequency domain at the composition step. Since, for a known sequence length N, some of the scale factors can be computed prior to composition this allows some of the processing to be done "offline" or in non-real time as opposed to performing the computation in real time as, for example, when data is streaming in to an encoder. Additionally, some of the scale factor values may be known constants, such as zero, so that the computation for the corresponding coefficients can be omitted to further optimize processing.

A mathematical basis for scaling in the frequency domain is shown in the derivation in the following sections. The derivation uses standard techniques as will be recognized by one of skill in the art. The fundamental mathematical rules, notation and basis upon which the derivation is based can be found, generally, in texts such as those cited above to Rao, K. R. and Yip, P. C. These texts are hereby incorporated by reference as if set forth in full in this document for all purposes. The derivation shows that Equation (1), above, can be decomposed into Equation (5), below.

$$DCT(k, N+1, x) = \qquad (5)$$
$$DCT\left(k, \frac{N}{2}+1, \hat{x}_e\right) + \frac{1}{2\cos\left(\frac{\pi k}{N}\right)} DCT\left(k, \frac{N}{2}+1, \hat{x}_o\right),$$
$$\left(k = 0, 1, \ldots \frac{N}{2}-1\right)$$
$$DCT\left(\frac{N}{2}, N+1, x\right) = DCT\left(\frac{N}{2}, \frac{N}{2}+1, \hat{x}_e\right)$$
$$DCT(N-k, N+1, x) =$$
$$DCT\left(k, \frac{N}{2}+1, \hat{x}_e\right) - \frac{1}{2\cos\left(\frac{\pi k}{N}\right)} DCT\left(k, \frac{N}{2}+1, \hat{x}_o\right),$$
$$\left(k = 0, 1, \ldots \frac{N}{2}-1\right)$$

where $\hat{x}_e(n)$ and $\hat{x}_o(n)$ are length $$\left(\frac{N}{2}+1\right)$$

sequence and are defined by $$\hat{x}_e(n) = x(2n), \quad \left(n = 0, 1, \ldots \frac{N}{2}\right) \qquad (6)$$
$$\hat{x}_o(n) = x(2n-1) + x(2n+1), \quad \left(n = 1, 2, \ldots \frac{N}{2}-1\right)$$
$$\hat{x}_o(0) = x(1)$$
$$\hat{x}_o\left(\frac{N}{2}\right) = x(N-1)$$

To prove Eqn. (5), we use Eqn. (1) and obtain:

$$DCT(k, N+1, x) = \sum_{n=0}^{N} x(n)\cos\left(\frac{\pi n k}{N}\right) \qquad (7)$$
$$= \sum_{n=0}^{N/2} x(2n)\cos\left(\frac{2\pi n k}{N}\right) +$$
$$\sum_{n=0}^{N/2} x'(2n+1)\cos\left(\frac{\pi(2n+1)k}{N}\right)$$
$$(k = 0, 1, \ldots N)$$

where $$x'(2n+1) = x(2n+1)\left(\text{for } n = 0, 1, \ldots \frac{N}{2}-1\right) \text{ and } x'(N+1) = 0.$$

Furthermore, Eqn. (7) becomes for k=0, 1, . . . N and $$k \neq \frac{N}{2}$$

$$DCT(k, N+1, x) = DCT\left(k, \frac{N}{2}+1, \hat{x}_e\right) + \quad (8)$$

$$\frac{1}{2\cos\left(\frac{\pi k}{N}\right)} \sum_{n=0}^{N/2} 2x'(2n+1)\cos\left(\frac{\pi(2n+1)k}{N}\right)\cos\left(\frac{\pi k}{N}\right)$$

$$= DCT\left(k, \frac{N}{2}+1, \hat{x}_e\right) +$$

$$\frac{1}{2\cos\left(\frac{\pi k}{N}\right)} \sum_{n=0}^{N/2} \left[x'(2n+1)\cos\left(\frac{\pi(2n+2)k}{N}\right) + \right.$$

$$\left. x'(2n+1)\cos\left(\frac{2\pi nk}{N}\right)\right]$$

$$= DCT\left(k, \frac{N}{2}+1, \hat{x}_e\right) +$$

$$\frac{1}{2\cos\left(\frac{\pi k}{N}\right)} \sum_{p=1}^{N/2+1} x'(2p-1)\cos\left(\frac{\pi(2p)k}{N}\right) +$$

$$\sum_{n=0}^{N/2} x'(2n+1)\cos\left(\frac{2\pi nk}{N}\right)$$

Setting x'(−1)=0 and using x'(N+1)=0, the above equation becomes $$DCT(k, N+1, x) = DCT\left(k, \frac{N}{2}+1, \hat{x}_e\right) + \quad (9)$$

$$\frac{1}{2\cos\left(\frac{\pi k}{N}\right)} \sum_{n=0}^{N/2} [x'(2n-1) + x'(2n+1)]\cos\left(\frac{2\pi nk}{N}\right)$$

$$= DCT\left(k, \frac{N}{2}+1, \hat{x}_e\right) +$$

$$\frac{1}{2\cos\left(\frac{\pi k}{N}\right)} \sum_{n=0}^{N/2} \hat{x}_o(n)\cos\left(\frac{2\pi nk}{N}\right)$$

$$= DCT\left(k, \frac{N}{2}+1, \hat{x}_e\right) +$$

$$\frac{1}{2\cos\left(\frac{\pi k}{N}\right)} DCT\left(k, \frac{N}{2}+1, \hat{x}_o\right)$$

$$\left(k = 0, 1, \ldots N, \text{ and } k \ne \frac{N}{2}\right).$$

for $$k = \frac{N}{2},$$

using Eqn. (1) results in $$DCT\left(\frac{N}{2}, N+1, x\right) = DCT\left(\frac{N}{2}, \frac{N}{2}+1, \hat{x}_e\right) \quad (10)$$

In addition, for $$k = 0, 1, \ldots \frac{N}{2},$$

using Eqn. (1)

$$DCT\left(N-k, \frac{N}{2}+1, \hat{x}_e\right) = DCT\left(k, \frac{N}{2}+1, \hat{x}_e\right) \quad (11)$$

$$DCT\left(N-k, \frac{N}{2}+1, \hat{x}_o\right) = DCT\left(k, \frac{N}{2}+1, \hat{x}_o\right)$$

Eqns. (9-11) conclude the proof of Eqn. (5).

From Eqn. (5), we could see the factor $$\frac{1}{2\cos\left(\frac{\pi k}{N}\right)}$$

is only related with frequency domain index "k" which is quite different from other DCT related algorithms. With this, we could move this factor to the final step of the computation and the algorithm becomes $$DCT(k, N+1, x) = S(k) * SDCT(k, N+1, x), \quad (12)$$

$$(k = 0, 1, \ldots N)$$

$$SDCT(k, N+1, x) =$$

$$\cos\left(\frac{\pi k}{N}\right) * SDCT\left(k, \frac{N}{2}+1, \hat{x}_e\right) + \frac{1}{2} SDCT\left(k, \frac{N}{2}+1, \hat{x}_o\right)$$

$$\left(k = 0, 1, \ldots \frac{N}{2}-1\right)$$

$$SDCT\left(\frac{N}{2}, N+1, x\right) = SDCT\left(\frac{N}{2}, \frac{N}{2}+1, \hat{x}_e\right)$$

$$SDCT(N-k, N+1, x) =$$

$$\cos\left(\frac{\pi k}{N}\right) * SDCT\left(k, \frac{N}{2}+1, \hat{x}_e\right) - \frac{1}{2} SDCT\left(k, \frac{N}{2}+1, \hat{x}_o\right)$$

$$\left(k = 0, 1, \ldots \frac{N}{2}-1\right)$$

where S(k) is called as a scaling factor in frequency domain and obtained by $$S(k) = \prod_{j=3}^{M} c(k, j) \text{ and} \quad (13)$$

$$c(k, j) = \frac{1}{\cos\left(\frac{\pi k}{N/2^{M-j}}\right)} \text{ if } \cos\left(\frac{\pi k}{N/2^{M-j}}\right) \ne 0$$

otherwise c(k,j)=1.

Figure 2:
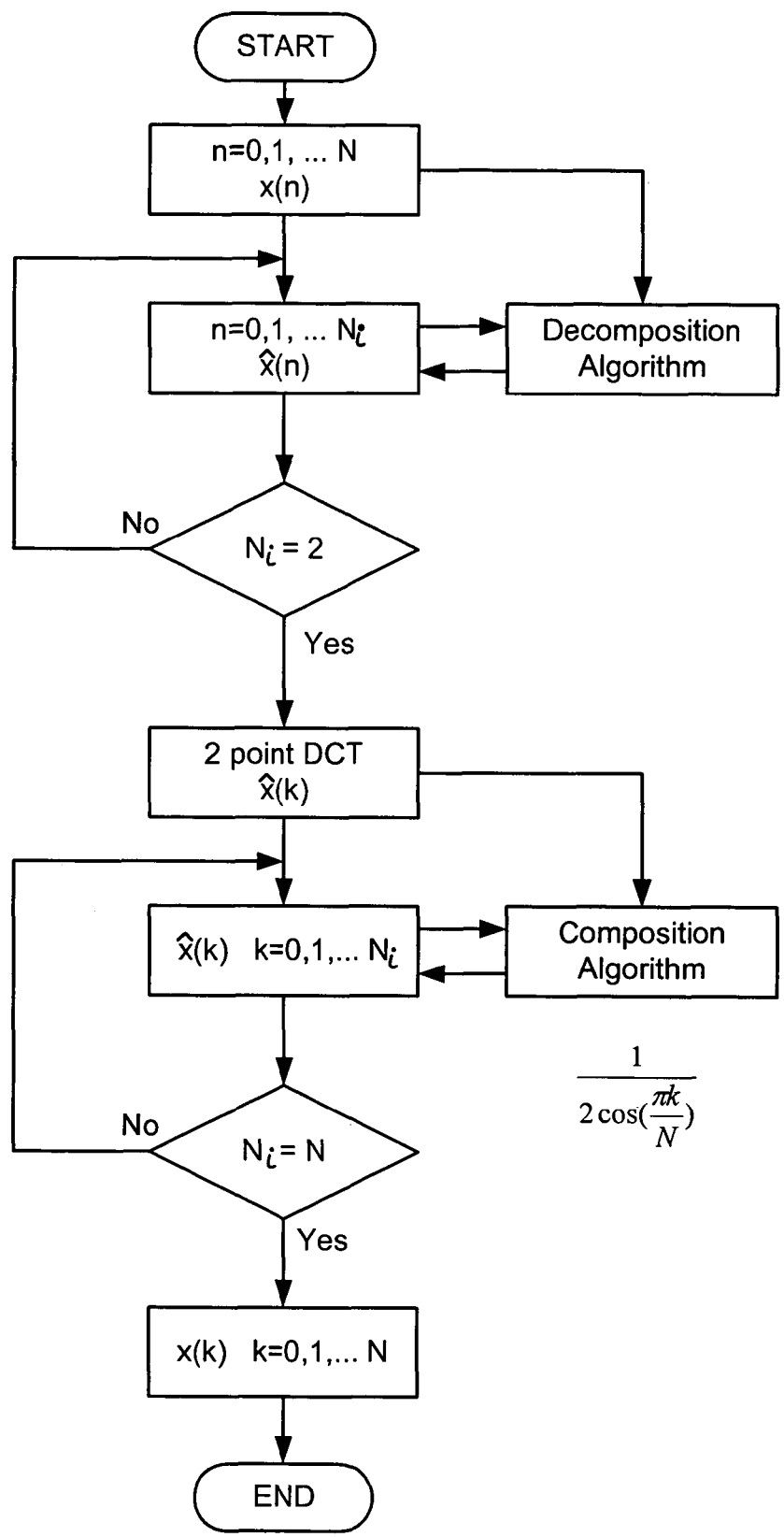
FIG. 2 illustrates an approach of the invention in obtaining a discrete cosine transform.

Thus, the use of a scale factor of the form $$\frac{1}{2\cos\left(\frac{\pi n}{N}\right)}$$

in a time-domain operation performed in an early step (i.e., decomposition) is omitted in favor of use of a scale factor of the form $$\frac{1}{2\cos\left(\frac{\pi k}{N}\right)}$$

in a frequency-domain operation performed in a later step (e.g., composition) as illustrated in FIG. 2.

Figure 3:
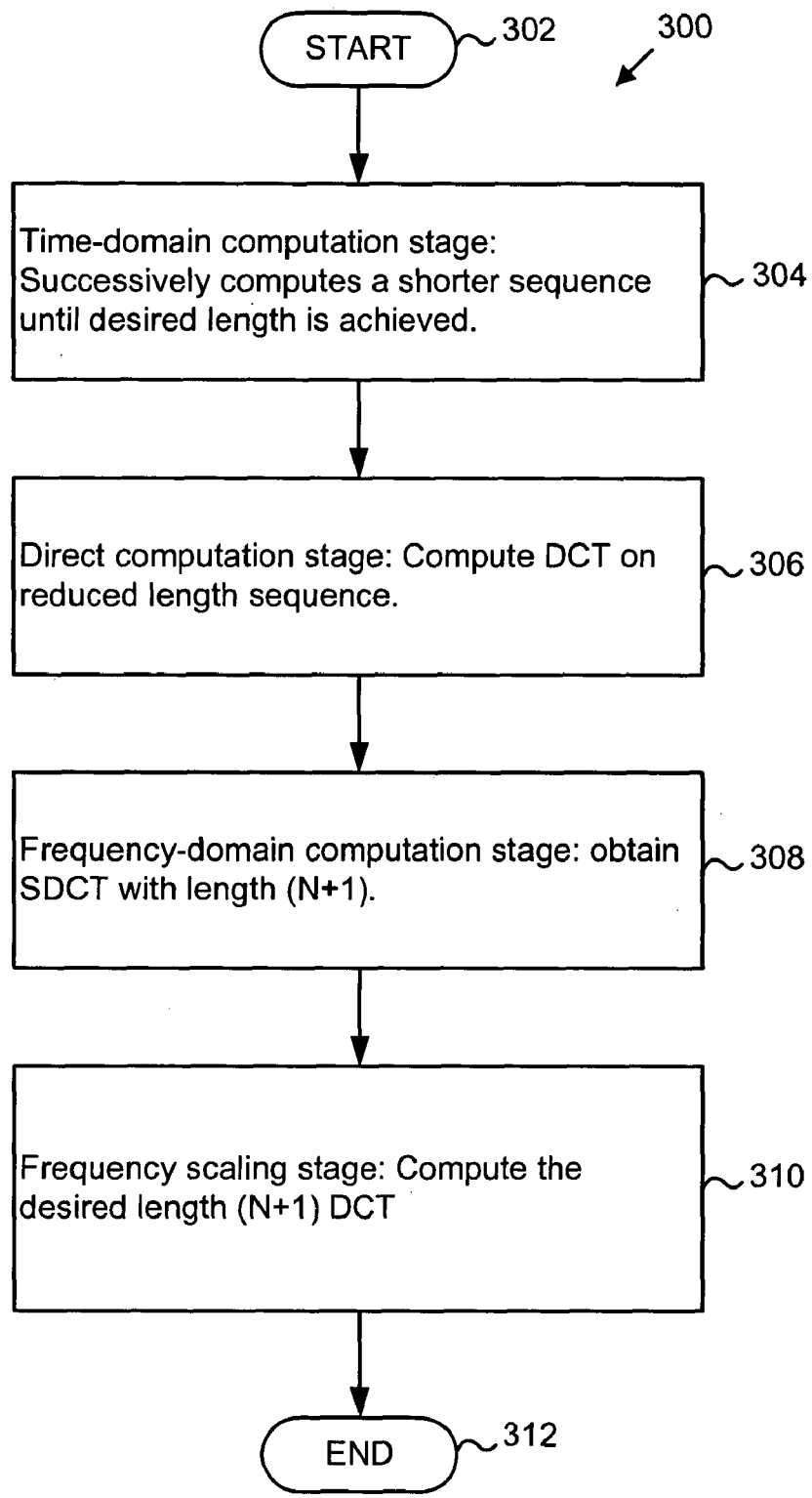
FIG. 3 shows a flowchart of basic steps to achieve a transform according to a specific embodiment of the invention.

With this approach, a preferred embodiment of the invention can implement the transform by using steps as shown in FIG. 3.

In FIG. 3, flowchart 300 is an outline of basic steps of a preferred embodiment to practice the invention. Flowchart 300 is entered at step 302 when it is desired to compute a length (N+1) DCT. Next, step 304 is executed to use Eqn. (6) to recursively compute shorter and shorter sequences via time-domain computation until the sequence length, $N_i$, becomes 2. Naturally, other embodiments can use sequences of any desired length. Next, step 306 is executed to obtain a DCT for the sequence obtained from step 304.

Step 308 is a frequency-domain computation stage whereupon processing in accordance with the last three equations of Eqn. (12) are used to obtain an SDCT with length (N+1). Step 310 is executed to perform scaling in the frequency domain to obtain the desired length (N+1) DCT by using the first equation of Eqn. (12). In order to help optimize this step, scaling factors which have fixed values for a given N (e.g., obtained from Eqn. (13)) can be computed "offline" or prior to the execution of the bulk of transform computation. The routine exits at step 312.

Although the invention has been described with respect to specific embodiments thereof, these embodiments are merely illustrative, and not restrictive of the invention. For example, although the invention has been discussed primarily with respect to DCTs, any other type of frequency-domain transform can be suitable for use with the invention. Although the examples discussed herein include decomposition to a 2-point DCT, benefits of the invention can be realized with any type of decomposition/composition algorithm and different sizes (e.g., 4, 8 or other) DCTs. It should be apparent that other factors rather than the specific scale factors discussed herein can be used in other embodiments. Other embodiments may perform a mix of time-domain and transform-domain scaling, since benefits can be realized without the need to perform all scaling in the frequency domain.

Any suitable programming language can be used to implement the routines of the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing.

Steps can be performed in hardware or software, as desired. Note that steps can be added to, taken from or modified from the steps in the flowcharts presented in this specification without deviating from the scope of the invention. In general, the flowcharts are only used to indicate one possible sequence of basic operations to achieve a functional aspect of the present invention.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, or store the program for use by or in connection with executing a set of the instructions. The computer readable medium can be, by way of example only but not limitation, an electronic, magnetic, electromagnetic, or semiconductor system, or computer memory.

A "processor" includes any system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The invention claimed is:

1. A computer implemented method of image processing by performing a frequency-domain transform on frames of pixel values in a time-domain sequence having a sequence length N, wherein the method is executed by a processor, the method comprising
   decomposing the time-domain signal to a plurality of decomposed signals, wherein each of the plurality of decomposed signals includes a sequence length less than N;
   performing a transform on the plurality of decomposed signals to obtain a transformed signal;
   composing the plurality of transformed signals to obtain a composed signal of the pixel values, including a sub step of
   frequency domain scaling at least one of the transformed signals to define the pixel value.

2. The method of claim 1, further comprising
   determining a value for a scale factor based on N; and
   using the determined value for a scale factor in the sub step of scaling at least one of the transformed signals.

3. The method of claim 2, wherein the steps of claim 1 are performed in real time and wherein the step of determining a value for a scale factor is performed in non-real time.

4. The method of claim 1, further comprising
   determining a value for a scale factor; and
   using the determined value for a scale factor in the substep of scaling at least one of the transformed signals.

5. The method of claim 4, wherein a value for a scale factor is a constant.

6. The method of claim 5, wherein a value for a scale factor is zero.

7. The method of claim 1, wherein the frequency-domain transform includes a discrete cosine transform.

8. The method of claim 7, wherein the substep of scaling at least one of the transformed signals includes a sub step of using a factor of $$\frac{1}{2\cos\left(\frac{\pi K}{N}\right)}$$

in the frequency domain scaling.

9. An apparatus for image processing including for performing a frequency-domain transform on a time-domain signal sequence defining a frame of pixel values having a sequence length N, the apparatus comprising
   a processor configured to;
   decompose the time-domain signal to a plurality of decomposed signals, wherein each of the plurality of decomposed signals includes a sequence length less than N;
   perform a transform on the plurality of decomposed signals to obtain a transformed signal; and
   compose the plurality of transformed signals to obtain a composed signal comprising the pixel values,
   including frequency domain scaling scale at least one of the transformed signals to define the pixel values.

10. The apparatus of claim 9, further configures to determine a value for a scale factor based on N; and use the determined value for a scale factor in scaling at least one of the transformed signals.

11. The apparatus of claim 10, wherein a value for a scale factor is a constant.

12. The apparatus of claim 11, wherein a value for a scale factor is zero.

13. The apparatus of claim 12, wherein the substep of frequency-domain transform includes a discrete cosine transform.

14. The apparatus of claim 13, wherein the frequency domain scaling at least one of the transformed signals includes using a factor of $$\frac{1}{2\cos\left(\frac{\pi K}{N}\right)}$$

in the frequency domain scaling.

15. A computer-readable medium including instructions executable by a processor for performing a method of image processing by performing a frequency-domain transform on a time-domain signal sequence on frames of pixel values having a sequence length N, by performing the steps of:
- decomposing the time-domain signal to a plurality of decomposed signals, wherein each of the plurality of decomposed signals includes a sequence length less than N;
- performing a transform on the plurality of decomposed signals to obtain a transformed signal; and
- composing the plurality of transformed signals to obtain a composed signal comprising the pixel value,
- including the substep of frequency domain scaling at least one of the transformed signals to define the pixel values.

16. The computer-readable medium of claim 15, further comprising
- determining a value for a scale factor based on N; and
- using the determined value for a scale factor in the sub step of scaling at least one of the transformed signals.

17. The computer-readable medium of claim 16, wherein the steps of claim 15 are performed in real time and wherein the step of determining a value for a scale factor is performed in non-real time.

18. The computer-readable medium of claim 17, wherein a value for a scale factor is a constant.

19. The computer-readable medium of claim 15, further comprising
- determining a value for a scale factor; and
- using the determined value for a scale factor in the substep of scaling at least one of the transformed signals.

20. The computer-readable medium of claim 19, wherein a value for a scale factor is zero.

21. The computer-readable medium of claim 20, wherein the substep of scaling at least one of the transformed signals includes a sub step of using a factor of $$\frac{1}{2\cos\left(\frac{\pi K}{N}\right)}$$

in the frequency domain scaling.

22. The computer-readable medium of claim 15, wherein the frequency-domain transform includes a discrete cosine transform.

* * * * *